200
UNITED STATES PATENT OFFICE.

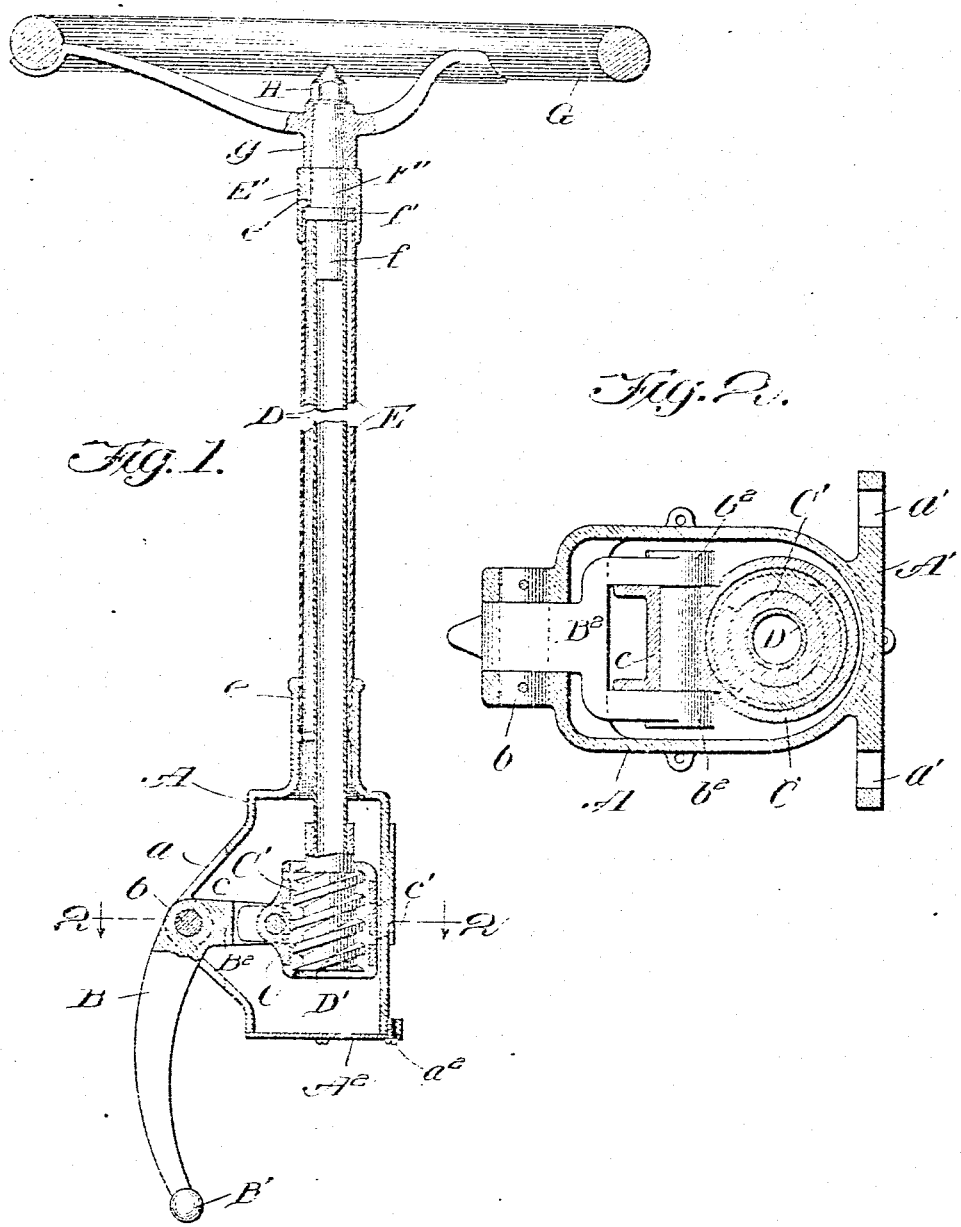

ROBERT SYMMONDS, JR., OF KENOSHA, WISCONSIN, ASSIGNOR TO THOMAS B. JEFFERY, OF KENOSHA, WISCONSIN.

AUTOMOBILE STEERING MECHANISM.

948,800.  Specification of Letters Patent.  Patented Feb. 8, 1910.

Application filed August 2, 1906. Serial No. 328,872.

*To all whom it may concern:*

Be it known that I, ROBERT SYMMONDS, Jr., a citizen of the United States, residing at Kenosha, county of Kenosha, State of Wisconsin, have invented a certain new and useful Improvement in Automobile Steering Mechanism, and declare the following to be a full, clear, and exact description of the same, such as will enable others skilled in the art to which it pertains to make and use the same, reference being had to the accompanying drawings, which form a part of this specification.

My invention relates in general to automobiles and more particularly to steering mechanism for self-propelling vehicles.

Automobile steering mechanism as usually constructed comprises a hand wheel fixed upon an up-right shaft, and means interposed between the shaft and the steering wheels for directing the course of the vehicle according to the direction of rotation of the hand-wheel. It is desirable that a comparatively slight pressure exerted upon the hand-wheel may positively control the direction of movement of the vehicle.

The primary object of my invention is to provide a mechanism for operatively connecting the steering shaft of an automobile with the steering wheels, which will quickly and certainly control the course of the automobile and will require the exertion upon the steering wheel of comparatively little force.

A further object of my invention is to provide a steering mechanism for automobiles which will be simple in construction, inexpensive in manufacture, and efficient in use.

My invention as herein embodied may be generally described as comprising an upright shaft, a sleeve having a coarse screw-thread thereon secured to the lower end of the shaft, a hand-wheel fixed to the upper end of the shaft, a casing adapted to be secured to the frame of the automobile within which the lower end of the shaft extends, a nut surrounding and engaging the screw-thread on said sleeve, a bell-crank lever fulcrumed upon the casing, one arm of which is pivotally connected to the nut, while the other arm is adapted to be secured to the steering rods, a tube supported upon said casing and surrounding the steering shaft, and a support for the steering shaft mounted upon the upper end of said tube.

My invention will be more fully described hereinafter with reference to the accompanying drawings in which the same is illustrated as embodied in a convenient and practical form, and in which—

Figure 1 is a vertical central sectional view; and Fig. 2 a sectional view on line 2—2 Fig. 1.

The same reference characters are used to designate the same parts in the two figures of the drawings.

Reference character A designates a casing made of any suitable material, as for instance cast iron and provided with means for securing the same to the frame of an automobile, such means being shown as a bracket A' having holes a', a' therein through which fastening devices may extend. The lower end of the casing is provided with a removable bottom plate $A^2$ secured to lugs on the lower end of the casing by screws $a^2$.

B indicates a bell-crank lever fulcrumed upon a rod $b$ supported by the casing A. The short-arm $B^2$ of the bell-crank lever extends through an opening $a$ in the casing to the interior thereof, while the longer depending arm B' of the bell-crank lever is adapted to be connected to steering rods (not shown). The short-arm $B^2$ of the bell-crank lever is bifurcated and receives between the portions $b^2$, $b^2$ thereof a lug $c$ projecting from a sleeve C cast around a coarse threaded nut C'. The nut is preferably made of hard metal around which the sleeve C is cast, projection $c'$ being preferably provided on the nut to be embedded in the sleeve.

D indicates the steering-shaft which is preferably tubular and extends at its lower end within the casing A.

D' indicates a screw-threaded sleeve fixed upon the lower end of the shaft D and engaging the nut C'. Surrounding the shaft D is a tube E supported at its lower end within the restricted upper end $e$ of the casing A. Secured to the upper end of the tube E is a ring E' through which extends a post F' rigidly secured to the upper end of the steering shaft D. The post F'', provided with a reduced portion $f$ extending within the upper end of the hollow shaft D.

A ring $f'$ is formed on the post $F'$ and rests upon the upper end of the shaft D and underlies a shoulder $e'$ and the ring $E'$.

A hand-wheel G is rigidly secured to the upper end of the shaft D through the medium of a hub $g$ engaging the portion of the post $F'$ projecting above the ring $E'$.

H designates a nut for tightly securing the hub of the hand-wheel on the tapered portion of the post $F'$ projecting above the ring $E'$.

The hollow shaft D may be conveniently secured at its lower end within the sleeve $C'$ and at its upper end around the portion $f$ of the post by brazing. The lower end of the support tube E may be secured within the reduced portion $e$ of the casing also by brazing while the upper end of the tube E may be secured in a similar manner within the lower end of the ring $E'$.

The operation of my invention will be readily understood from the foregoing description, and is as follows: Rotary motion applied to the hand-wheel G is communicated to the hand shaft D which rotates the screw-threaded sleeve $D'$ within the nut $C'$ thereby moving the nut up or down according to the direction of rotation of the hand-wheel. The upward or downward movement of the nut $C'$ oscillates the bell-crank lever B through the pivotal engagement between the bifurcated arm of the bell-crank lever and the sleeve around the nut. The lower arm of the bell-crank lever is consequently oscillated in one direction or the other and the course of the vehicle thereby directed according to the direction of rotation of the hand wheel. The upward and downward movement of the nut will be in the arc of a circle described around the fulcrum of the bell-crank lever as a center. A slight lateral movement will consequently be imparted to the lower end of the shaft D, but such lateral movement is so slight that it is readily permitted by the connection between the upper end of the shaft and the surrounding supporting sleeve. The shaft is prevented from moving upwardly or downwardly by reason of the flange $f'$ underlying the shoulder $e'$ and the hub $g$ overlying the upper end of the ring $E'$.

By supporting the shaft merely at its upper end adjacent the hand-wheel it is possible to connect its lower end to a bell-crank lever through the medium of a screw-threaded sleeve and nut without necessitating provision for a relative movement between the bell-crank lever and nut.

From the foregoing description it will be observed that I have invented an improved steering mechanism for automobiles which may be conveniently secured to the frame of the machine, and which though simple in construction is efficient and durable in use.

Having now fully described my invention, what I claim as new and desire to secure by Letters Patent is:

1. In a steering mechanism for automobiles the combination with a steering shaft, of a casing into which the lower end of said shaft extends, means for securing said casing to the automobile frame, a tube mounted upon said casing, and surrounding said shaft, a ring carried by the upper end of said tube, a circular flange fixed to said shaft and underlying said ring, a hand wheel fixed to said shaft above and engaging said ring, and means located within said casing engaging said shaft whereby a rotary movement of the shaft will be communicated to the steering wheels of the automobile.

2. In a steering mechanism for automobiles the combination with a steering shaft, of a casing into which the lower end of said shaft extends, means for securing said casing to the automobile frame, a tube mounted upon said casing, and surrounding said shaft, a ring carried by the upper end of said tube, a circular flange fixed to said shaft and underlying said ring, a hand-wheel fixed to said shaft above and engaging said ring, a nut located within said casing surrounding and engaging a screw-thread on the lower end of said shaft, a bell-crank lever fulcrumed upon said casing, one arm of which is adapted to be connected to the steering wheels, and means for pivotally connecting said nut between the bifurcated portions of the other arm of said bell-crank lever.

In testimony whereof, I sign this specification in the presence of two witnesses.

ROBERT SYMMONDS, Jr.

Witnesses:
J. W. De Cou,
Charles T. Abbott.